Patented Sept. 29, 1953

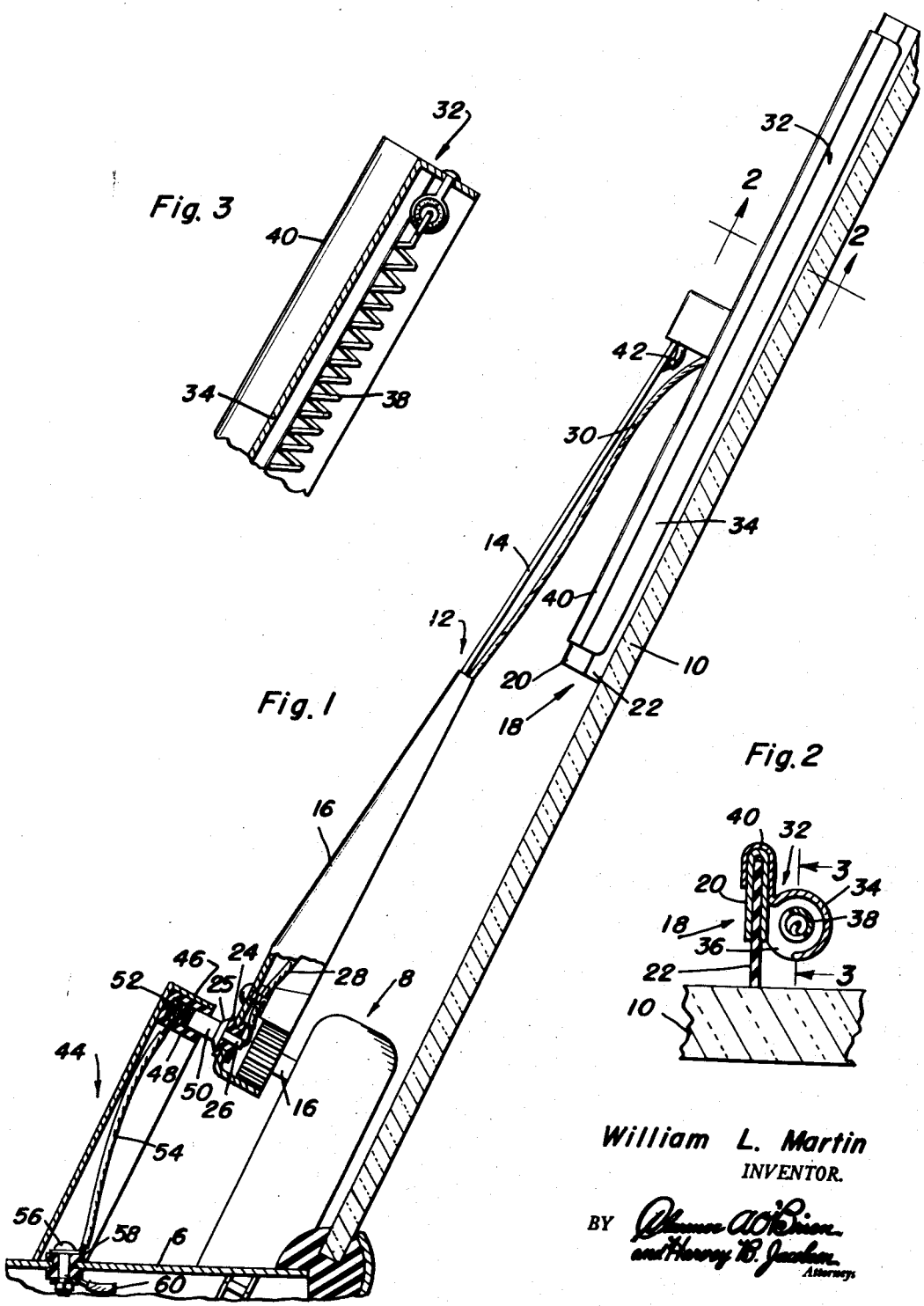

2,654,016

UNITED STATES PATENT OFFICE 2,654,016

ELECTRICALLY HEATED WINDSHIELD WIPER

William L. Martin, Gastonia, N. C., assignor of one-fourth to L. B. Hollowell, Gastonia, N. C.

Application August 19, 1952, Serial No. 305,263

4 Claims. (Cl. 219—19)

The present invention relates to certain new and useful improvements in an electrically heated windshield wiper, the use of which will serve to melt sleet and snow, whereby to keep the vision area of the windshield sufficiently clean and clear for safe and reliable driving.

As is doubtless evident from the preceding statement of the nature of the invention, electrically heated windshield wipers are not broadly new. As a matter of fact, many and varied styles and forms of electrically heated wipers have been contrived by others. For one reason or another, these prior art constructions have, it would seem, failed to come into widespread use. The need however, for such safety appliances is fully well recognized and it is therefore an object of the instant matter to provide an improved structural combination in which the respective needs of manufacturers and users are seemingly met.

From a structural point of view novelty is predicated on a practical and economical construction and arrangement wherein conventional type windshield wipers may be retained in substantially intact form, the provisions of the instant accomplishment being added thereto by way of minimum alterations.

It is within the purview of the invention to provide a wiper blade with a suitably embedded heating coil or element; or, alternatively, to provide an attachment, including a heating coil which may be applied to the types of blades already on the market.

Another aspect of the invention has to do with providing a separate contact button and mounting the same, by way of an insulated grommet, in an aperture in the lower end portion of the windshield wiper arm.

A further aspect of the invention has to do with a fixture or bracket, which is applicable to the cowl opposite to the operating mount for the windshield wiper arm, said fixture being channel shaped in cross-section, being provided at one end with a spring loaded socket member and carbon brush for coaction with the contact button, said brush having a current delivery conductor connected with its spring and said conductor being joined with a terminal or binding post carried by a second insulated grommet on the cowl and housed in the channel of the fixture.

Other objects, features and advantages will become more readily apparent from the following description and the accompanying sheet of drawings.

In the accompanying drawings wherein like numerals are employed to designate like parts throughout the same:

Figure 1 is a view in section and elevation showing a windshield, portion of a cowl, the windshield wiper construction and mount therefor and showing, in addition, the improved facilities for electrically heating the wiper blade.

Figure 2 is a section taken on the plane of the line 2—2 of Figure 1 looking in the direction of the arrows.

Figure 3 is a fragmentary section on the vertical line 3—3 of Figure 2 looking in the direction of the arrows.

Referring now to the drawings by numerals and accompanying lead lines, the usual cowl is denoted by the numeral 6 and this supports the standard type mount 8 in front of the windshield 10. The windshield wiper arm which is conventional in type, is denoted by the numeral 12 and comprises a spring arm 14 carried by a channel shaped sheath 16 which is operatively connected at 16 with the mount or support means 8. The windshield wiper blade is denoted by the numeral 18 and comprises a sheath 20 operatively connected with the arm 14 and carrying the rubber or equivalent wiper blade 22.

In accordance with the invention the lower portion of the web of the arm 16 is provided with an aperture or opening and a rubber or equivalent grommet 24 is mounted in the aperture. The contact element is in the form of a button 25 having a stem 26 fitted into the grommet and having a conductor wire 28 connected thereto. The wire extends upwardly along the arm as at 30. In practice it is within the purview of the invention to make the rubber wiper strip or blade 22 of strong flexible heat resistant rubber with a small resistant wire embedded to provide the heating element. By preference, however, the wiper blade is left unaltered and an attachment is provided and the attachment is denoted by the numeral 32. This comprises a housing or casing of general cylindrical form at 34, having a heat relief slot 36 (see Figure 2), there being an electric coil or heating element 38 of proper construction mounted therein, with the casing having a hooked attaching flange 40 which is removably engaged over the sheath 20. The wire means 30 is connected with the heating coil and there is a return wire 42 which is suitably anchored and used as a ground. Thus the only alteration in the arm 16 is the provision of the grommet and the contact button and the attachment means 32 may be applied to the blade without altering the latter.

The complement unit takes the form of a bracket or fixture which is denoted at 44. The fixture is preferably channel shaped in cross section and the channel is open at the bottom and closed at the top as in 46, and the open bottom portion is suitably attached to the cowl 6. A spring loaded socket member 48 is provided and this is suitably mounted in the upper closed end portion of the channel, said socket member being provided with a carbon projectible and retractable brush 50 in axial alignment with and constantly engaging the contact button 25. The coil spring is denoted at 52 and the current delivery wire or conductor is denoted at 54 and this is housed in the channel and is joined to a terminal or binding post 56 mounted in a second insulated grommet 58 which in turn is mounted in an opening in the cowl. The complemental wire leading to the storage battery is denoted at 60 and this is, of course, joined to the binding post. It will be clear therefore that the power to operate the electrically heated means for the wiper blade is supplied by the usual storage battery.

This heated blade construction will be of considerable advantage to a motorist in the morning when windshield is iced up and the blade has become stuck. By merely turning on the current the blade will promptly free itself and will then go to work to remove ice and sleet accumulations over the usual vision area. This wiper construction will preferably be wired through the ignition switch so that it cannot be left on accidently all night and in actual practice may be provided with a telltale or signal light to show when it is on and off, if desired.

It is thought that persons skilled in the art to which the invention relates will be able to obtain a clear understanding of the invention after considering the description in connection with the drawings. Therefore, a more lengthy description is regarded as unnecessary.

Minor changes in shape, size and arrangement of details coming within the field of invention claimed may be resorted to in actual practice, if desired.

Having described the invention, what is claimed as new is:

1. In a heated-type windshield wiper construction, in combination, a relatively stationary support including mechanical operating means, a wiper arm operatively mounted at its lower end on said means, blade means carried by the upper end of said arm and carrying an electrical heating element, a contact element carried by said arm, a current conducting connection between said contact element and heating element, a spring pressed brush in constant operating engagement with said contact element, a separate support fixture for said brush, said fixture being contiguous to said support, and a current supply conductor operatively joined with said brush, said contact element being in the form of a metal button mounted in an insulated grommet fitted in an aperture provided therefor in the lower end portion of said arm, said support fixture being channel-shaped in cross-section with its open side facing said contact element, said brush being mounted in a spring loaded socket member accessibly mounted in the channel of said fixture.

2. In combination, a fixture adapted to be secured on a fixed cowl, said fixture being channel-shaped in cross-section and open on one side, open at the lower end and closed at the upper end, an insulated grommet adapted to be mounted on a complemental portion of said cowl and sheathed in the open lower end portion of said fixture, a terminal post mounted in said grommet, an insulated spring loaded socket member fitted into the upper closed end of the channel in said fixture, a carbon brush operatively mounted in said socket member, a current conductor confined in said channel and electrically connected at its respective ends with said terminal post and spring in said socket member, a wiper arm, support and operating means for said wiper arm, an insulated grommet fixed in an opening in the lower end portion of said arm, a contact button mounted in said last named grommet and axially aligned with said carbon brush, a wiper blade carried by said wiper arm, an electrical heating element, means operatively associating said heating element with said blade, and a second current conductor mounted in said wiper arm and operatively connected with said heating element and said contact button.

3. The structure defined in claim 2, wherein said latter associating means comprises an elongate slotted casing, said electric heating element confined in said casing, and a hooked flange carried by casing and removably mounting said casing on the usual sheath portion of said wiper blade.

4. In combination, a cowl, a relatively stationary support mounted on said cowl and including a mechanical operating means, a wiper arm operatively connected at its lower end with said operating means, a wiper blade carried by the upper end of said arm and carrying an electrical heating element, said arm being provided at its lower operated end with an aperture, an insulated grommet fitted and secured in said aperture, a metal contact button mounted in said grommet, a support fixture mounted on said cowl in general parallelism in respect to said stationary support, the lower end of said wiper arm being interposed in the space between said support and support fixture, said support fixture being channel-shaped in cross-section, open on one side and open at the lower end and closed at its upper end, said open side facing said wiper arm and stationary support, an insulated grommet mounted on said cowl and sheathed in the open lower end portion of said fixture, a terminal post mounted in said grommet, an insulated spring loaded socket member fitted in the upper closed end of the channel of said fixture, a carbon brush operatively mounted in said socket, said brush being axially aligned with and engaging said contact button, a current conductor confined in said channel and electrically connected at its respective ends with said terminal post and the spring in said socket member, a second current conductor carried by said wiper arm and electrically connected at its upper end with the electrical heating element and at its lower end with said contact button.

WILLIAM L. MARTIN.

References Cited in the file of this patent

UNITED STATES PATENTS

| Number | Name | Date |
| --- | --- | --- |
| 1,643,067 | Goodman | Sept. 20, 1927 |
| 1,665,950 | Dwyer et al. | Apr. 10, 1928 |
| 1,719,006 | Fogland | July 2, 1929 |
| 1,739,806 | Sparling | Dec. 17, 1929 |
| 1,750,524 | Kimmick | Mar. 11, 1930 |
| 2,550,504 | Vidrick et al. | Apr. 24, 1951 |